United States Patent [19]

Downs et al.

[11] Patent Number: 5,365,804
[45] Date of Patent: Nov. 22, 1994

[54] PARKING MECHANISM FOR A POWER TRANSMISSION

[75] Inventors: Robert C. Downs, Clarkston; Kyle K. Kinsey, Highland, both of Mich.

[73] Assignee: Saturn Corporation, Troy, Mich.

[21] Appl. No.: 70,580

[22] Filed: Jun. 2, 1993

[51] Int. Cl.$^5$ .......................... G05G 5/06; G05G 1/00
[52] U.S. Cl. ........................................ 74/535; 74/575; 74/577 M; 74/577 R; 192/4 A; 188/31; 188/69
[58] Field of Search .............. 74/575, 576, 577 R, 74/577 M, 475, 411.5; 192/4 A; 188/31, 69

[56] References Cited

U.S. PATENT DOCUMENTS

| | | | |
|---|---|---|---|
| 3,601,231 | 3/1969 | Kolacz | 188/69 |
| 3,990,541 | 11/1976 | Dobrinska et al. | 188/31 |
| 4,029,267 | 6/1977 | Slipper | 74/577 M X |
| 4,089,394 | 5/1978 | Haupt et al. | 192/4 A |
| 4,157,745 | 6/1979 | Nelson | 188/31 |
| 4,310,081 | 1/1982 | Kolacz | 74/475 X |
| 4,413,712 | 11/1983 | Richard | 74/577 S |
| 5,170,869 | 12/1992 | Svab et al. | 188/31 X |
| 5,182,959 | 2/1993 | Chern et al. | 192/4 A X |
| 5,269,195 | 12/1993 | Kitagawara | 74/577 M X |

FOREIGN PATENT DOCUMENTS 4-85153  3/1992  Japan .................. 192/4 A

*Primary Examiner*—Vinh T. Luong
*Attorney, Agent, or Firm*—Donald F. Scherer

[57] ABSTRACT

A countershaft type power transmission has a plurality of selectively engageable friction clutches for establishing a plurality of forward drive ratios and a reverse drive ratio between meshing gear members on an input shaft, a countershaft and an output shaft. One of the power paths established by the meshing gears includes a gear member rotationally fast on the output shaft. A parking pawl member is selectively engageable with this gear member to prevent output shaft rotation when parking is desired. The pawl has teeth formed thereon having a profile which permit continuous simultaneous engagement between two teeth on the pawl and two teeth on the gear member regardless of the rotational bias imposed on the output shaft during parking.

2 Claims, 4 Drawing Sheets

PARKING MECHANISM FOR A POWER TRANSMISSION

TECHNICAL FIELD

This invention relates to power transmission assemblies having parking mechanisms, and more particularly, to such assemblies having two parking pawls engageable with a toothed member on the output shaft.

BACKGROUND OF THE INVENTION

In vehicles equipped with automatic transmissions, the park function is typically accomplished by locking the drive wheels of the vehicle through the transmission to ground. The wheels are generally held by engaging a parking pawl into a dedicated parking gear that is connected continuously with the wheels through the transmission output shaft. One such device is shown in U.S. Pat. No. 2,875,856 issued Mar. 3, 1959, to Mrlik et al.

Since the parking pawl prevents the wheels from turning by grounding them to the transmission case, the strength requirements of the pawl must generally be taken by a single tooth design mated to a gear having complementary teeth formed thereon. This results in designing the gear with a circular tooth thickness large enough to withstand the parking forces. The pawl is also designed with a pressure angle of approximately 16 degrees to provide for control of the push out force on the pawl during parking. This push out force must be maintained with any range, such that excessive pull out forces are not required when the transmission is parked on a steep grade.

There have been some consideration given to multi-tooth park mechanisms, however, these mechanisms do not generally provide the resistance to sheer loads that are desired.

SUMMARY OF THE INVENTION

This invention provides a parking pawl mechanism of reduced mass and cost and, most importantly, axial space. The parking function is accomplished by utilizing the reverse driven gear to provide the parking gear. The reverse driven gear is rotationally fast with the transmission output shaft and, therefore, when grounded, will provide the parking function desired.

The reverse gear does have a large diametral pitch, however, it also has a reduced circular tooth thickness. To accommodate this reduced circular tooth thickness, the present invention provides a parking pawl which will have two teeth in contact with the reverse gear during engagement and disengagement.

As a general rule, the working gears of the transmission have a pressure angle of approximately 22 degrees. The use of this pressure angle on the parking pawl teeth would result in excess push out forces resulting in the need for a heavier park mechanism.

The present invention solves this dilemma by rotating the pawl teeth on the parking pawl 6 degrees, thereby providing an effective and more conventional pressure angle of 16 degrees between the park pawl and the reverse driven gear.

As is well known with park mechanisms, the parking pawl must engage during both a forward and a reverse rotational bias on the output shaft. To accommodate this situation, the present invention includes a duplicate set of pawl teeth, such that the first set will provide for the continuous contact if a forward rotational bias is present, and the second set will provide for continuous rotational contact if a reverse bias is present.

Since the parking pawl teeth will provide for continuous contact, the addendum circle of the parking pawl teeth is concentric with the addendum circle of the reverse driven gear when the tips of the teeth are in radial alignment. With this feature, the ratcheting forces are distributed over all four parking pawl teeth, thereby reducing the wear which might otherwise be present on a single tooth, and also reducing the loads on the tooth when engagement is attained.

It is therefore an object of this invention to provide an improved parking mechanism for a automatic shifting power transmission, wherein the park pawl has a plurality of teeth, two of which provide constant contact with a park gear in the transmission during engagement and disengagement of the parking pawl.

It is another engagement of this invention to provide an improved parking mechanism for an automatic transmission, wherein the parking pawl has a plurality of teeth having an addendum circle which is concentric to the addendum circle of the parking gear immediately prior to the teeth on the parking pawl being brought into mesh with the teeth on the parking gear.

These and other objects and advantages of the present invention will be more readily apparent from the following specification and drawings.

DESCRIPTION OF AN EXEMPLARY EMBODIMENT

Figure 1:
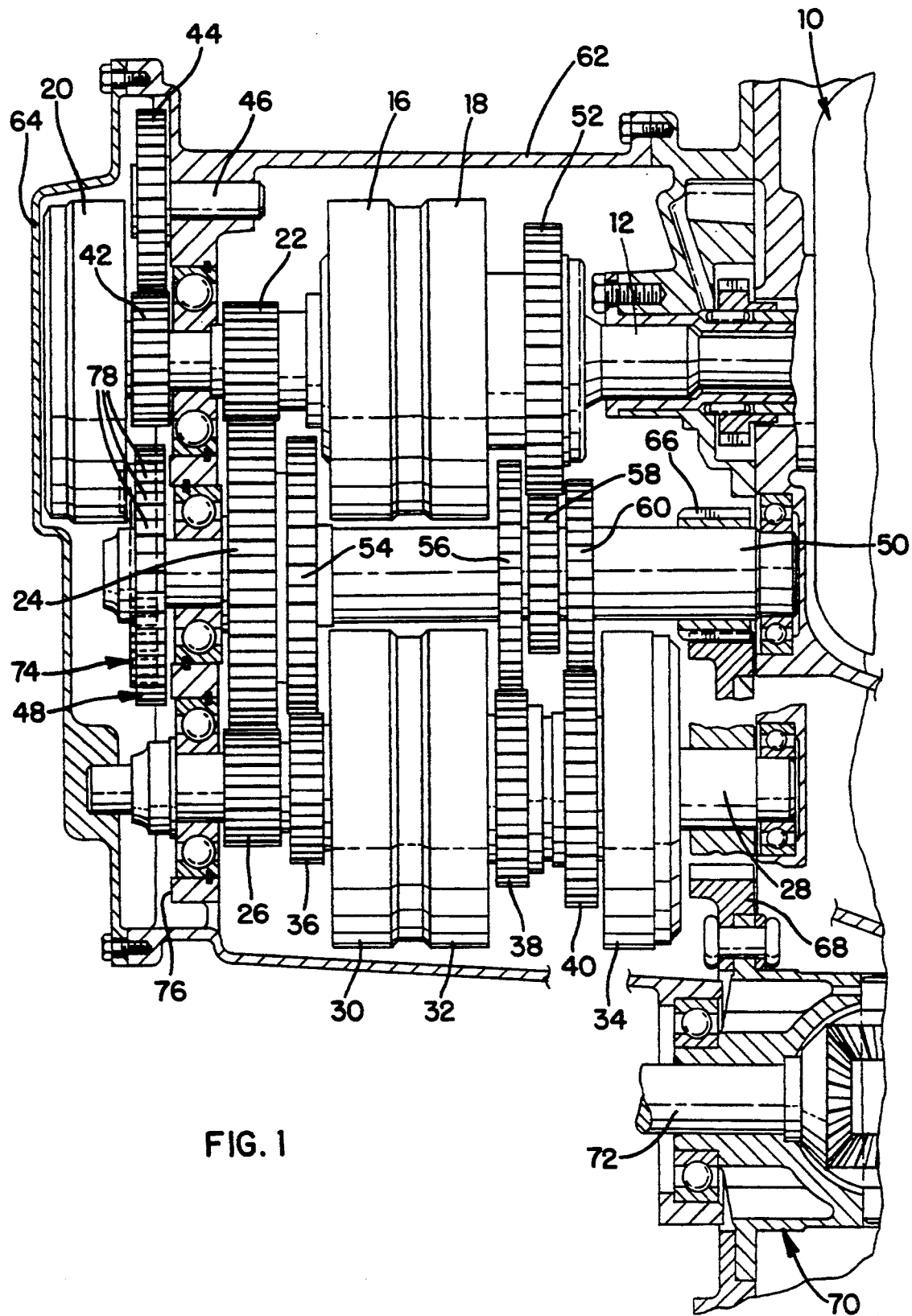
FIG. 1 is a cross-sectional elevational view of a power transmission incorporating the present invention and taken along the line 1—1 of FIG. 2.

In FIG. 1, there is seen a power transmission disposed in cross section. The powertrain shown therein can be constructed in accordance with U.S. Pat. No. 5,186,065 issued Feb. 16, 1993, to Downs. The transmission includes a torque converter 10, which drives an input shaft 12 on which is supported a first ratio clutch 16 and a fourth ratio clutch 18. Also drivingly secured with the input shaft 12 is a reverse clutch 20.

The first ratio clutch 16 is drivingly connected with a gear 22, which is disposed in meshing relation with a first ratio output gear 24, which in turn meshes with a transfer gear 26. The transfer gear 26 is rotatably secured with a countershaft 28 on which is supported a selectively operable second ratio clutch 30, a third ratio clutch 32 and fifth ratio clutch 34. Each clutch 30, 32 and 34 has associated therewith a respective gear 36, 38 and 40.

The reverse clutch 20 has associated therewith a reverse gear 42 which meshes with a reverse idler gear 44 rotatably mounted on a shaft 46. The idler gear 44 meshes with a reverse driven gear 48 which is rotatably secured with an output shaft 50.

The gear 24 is mounted on a conventional one-way clutch, not shown, on the shaft 50, such that the first clutch 16 can be maintained in engagement throughout the forward drive ratios of second through fifth, if desired. The fourth ratio clutch 18, when engaged, is operable to connect the gear 52 through the input shaft 12.

The gear 36 meshes with a second ratio output gear 54, such that when clutch 30 is engaged, the drive ratio between the input shaft 12 and output shaft 50 is determined by the gears 36 and 54. The gear 38 is driving connected with a third ratio output gear 56, the gear 52 is meshingly connected with a fourth ratio output gear 58, and the gear 40 meshes with a fifth ratio output gear 60.

The reverse gear 48 and the forward gears 54, 56, 58 and 60 are all drivingly connected with the output shaft 50. Therefore, whenever the output shaft 50 has a rotational bias imposed thereon, these gear members also have a rotational bias imposed thereon.

The transmission disclosed herein has the gear members and clutches enclosed in a housing 62, which is closed at one end by an end cover 64. The end cover 64 is preferably constructed in accordance with the end cover shown in U.S. Pat. No. 5,111,872, issued May 12, 1992, to Diehl et al. This end cover design will permit the distribution of lubrication and control fluid to the various clutches and bearings required in the transmission.

The output shaft 50 has a gear 66 mounted thereon, which meshes with a ring gear 68 which is a component within a conventional differential 70. The differential 70 has a pair of output shafts, one of which is shown at 72, which are drivingly connected to the vehicle wheels in a well known manner. The wheels connected with the output shaft 72 are therefore operable to impose a rotational bias on the gears which are connected with the output shaft 50. In particular, the gear 48, which is the reverse driven gear, has the rotational bias imposed thereon.

Figure 2:
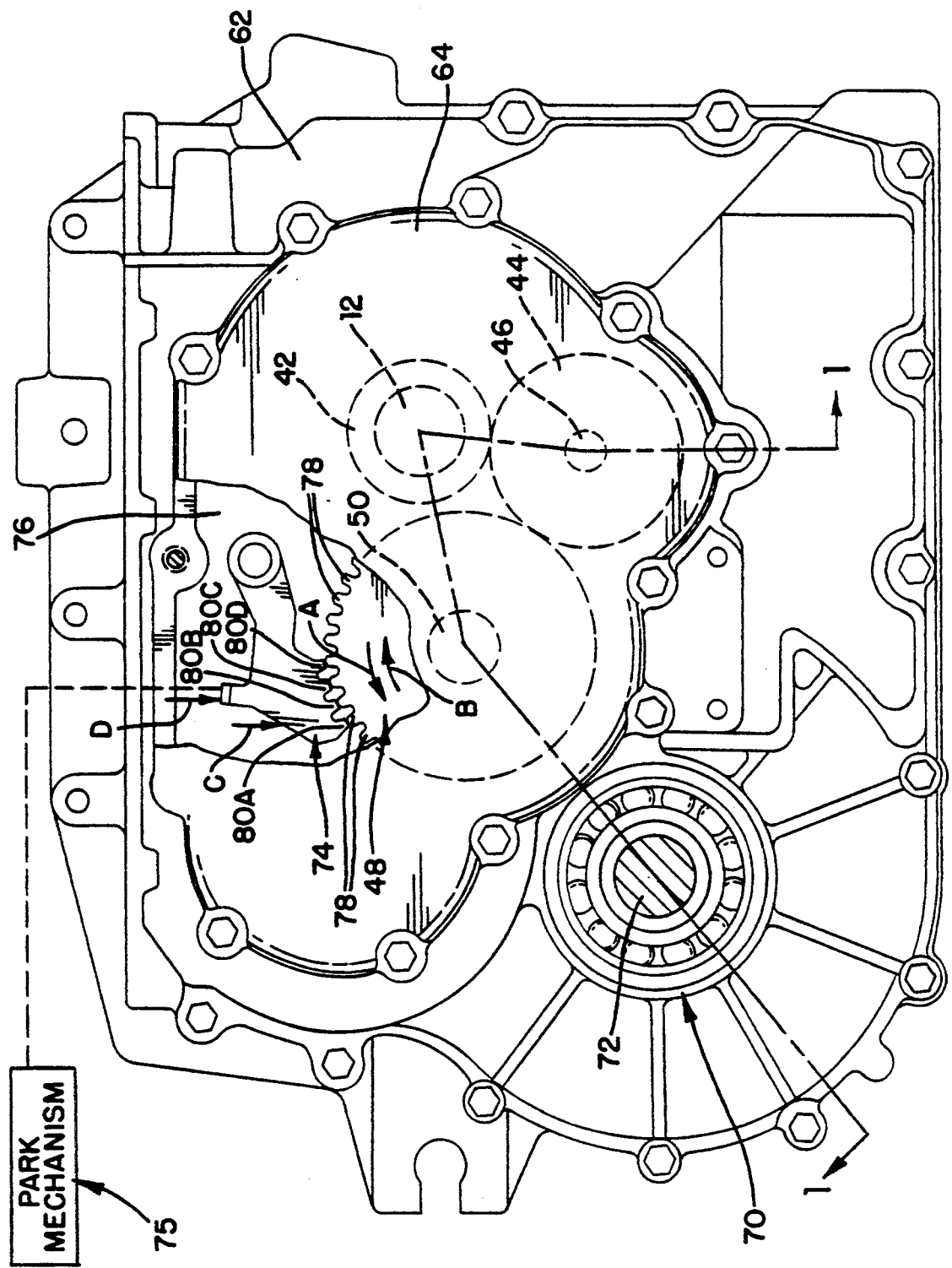
FIG. 2 is an end view with a portion of the end cover removed showing the location of the parking pawl and park gear.

As viewed in FIG. 2, the reverse gear 48 has a bias in the direction of Arrow A, if a forward rotational bias is imposed on the output shaft, and in the direction of Arrow B, if a reverse rotational bias is imposed thereon. A parking pawl 74 is pivotally mounted on a transmission wall 76 for engagement by a conventional parking mechanism 75 with the reverse driven gear 48. The reverse driven gear 48 has a plurality of teeth, generally designated 78, which are of conventional design to permit the transmission of power from the input shaft 12 to the output shaft 50 whenever a reverse ratio is desired.

The parking pawl 74 has four teeth 80A, 80B, 80C and 80D formed thereon. As best seen in FIGS. 3 through 8, these teeth can be brought into mesh with the teeth 78 of the reverse driven gear 48. The teeth 80A through 80D have an addendum circle 82 which defines the innermost surface or the tip of the teeth 80A through 80D. The gear teeth 78 have an addendum circle 84 which defines the outermost surface or tip of the teeth 78.

When the teeth 80A through 80D are aligned tip-to-tip with the teeth 78, as shown in FIG. 2, the addendum circles 82 and 84 are concentric, such that the tips of the four teeth 80A through 80D will abut radially with a respective one of the teeth 78 on the gear 48. This can occur during a parking manipulation. However, the reverse driven gear 48 generally will not remain stationary in this position as either a forward or reverse bias will be imposed because the vehicle has a slight tendency to roll.

Figure 3:
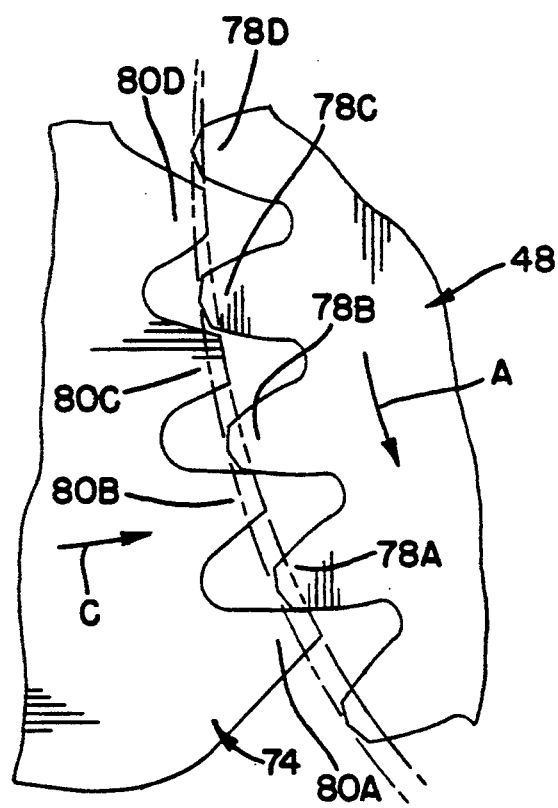
FIG. 3 is an enlarged view of the parking pawl during engagement with the park gear at initial engagement when a forward rotational bias is imposed on the park gear.
Figure 4:
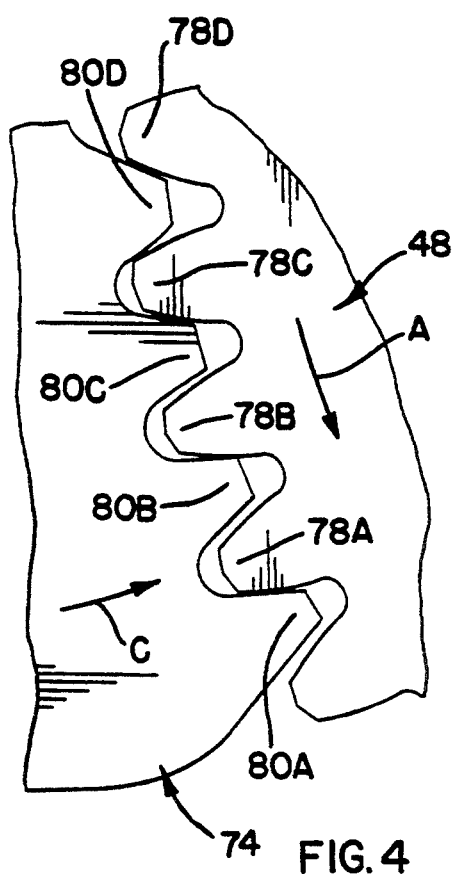
FIG. 4 is an enlarged view of the parking pawl during engagement with the park gear at approximately 50 percent engagement when a forward rotational bias is imposed on the park gear.
Figure 5:
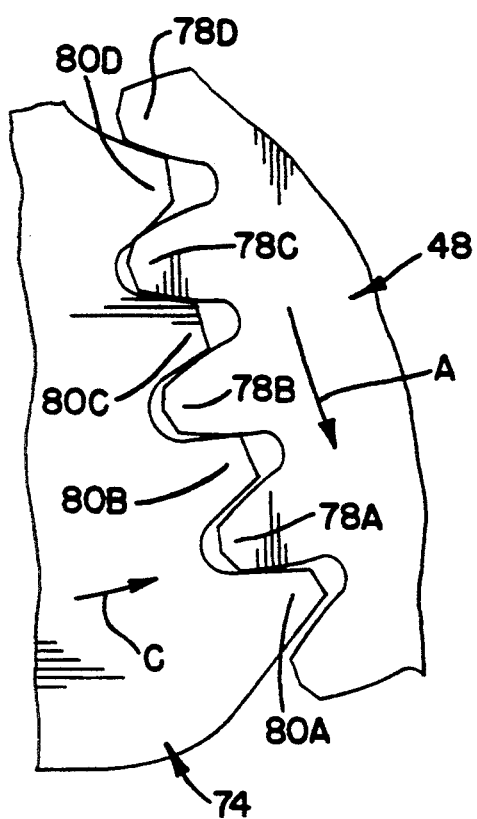
FIG. 5 is an enlarged view of the parking pawl during engagement with the park gear at full engagement when a forward rotational bias is imposed on the park gear.

In FIGS. 3 through 5, the park engagement is shown with a forward bias in the direction of Arrow A being imposed on the reverse gear. As best seen in FIG. 3, the parking pawl 74 begins engagement with the gear 48 by the abutment or contact of the teeth 80A and 80B with respective teeth, specifically designated 78A and 78B. The teeth 80C and 80D remain out of contact with the respective teeth 78C and 78D.

FIG. 4 shows progressive movement of the pawl 74 in the direction of Arrow C. As seen, the teeth 80A and 80B increase their depth of penetration between the adjacent teeth 78A and 78B. FIG. 5 shows the complete engagement of the parking pawl within the reverse driven gear 48.

It should be appreciated from FIGS. 3 through 5 that the teeth 80A and 80B will share the shear loading which might occur due to the forces being imposed by the vehicle weight during the parking maneuver, and in FIG. 5 after the parking maneuver has been fully reached. The teeth 80C and 80D may also come into contact with the reverse driven gear 48 if there is sufficient loading on the gear teeth 78 to permit deflection of the gear teeth 78 and the gear teeth 80A and 80B.

Figure 6:
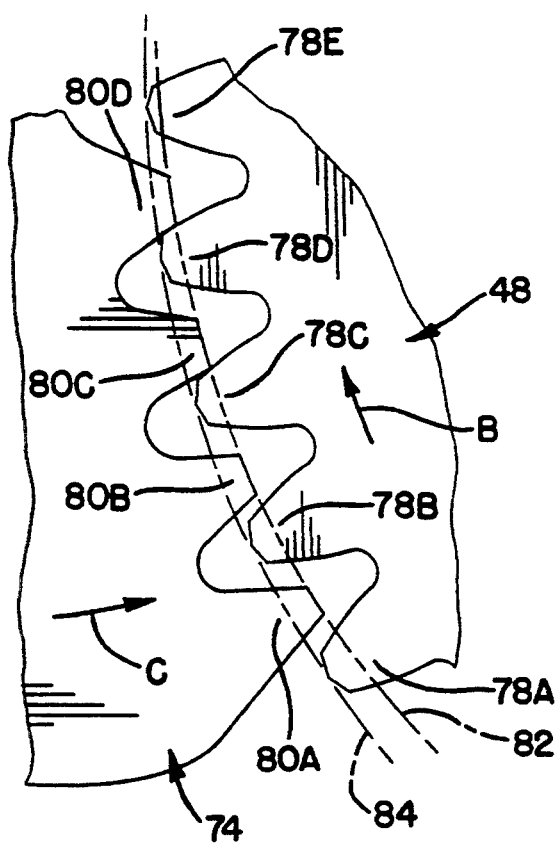
FIG. 6 is a view similar to FIG. 3, wherein the park pawl is at initial engagement when a reverse rotation bias is imposed on the park gear during the parking/maneuver.

In FIG. 6, the initial contact between teeth 80C and 80D with teeth 78C and 78D is seen when a reverse bias, in the direction of Arrow B, is imposed on the reverse driven gear 48. It should be appreciated that prior to the position shown in FIG. 6, the tips of teeth 80A through 80D could have been aligned radially with the tips of teeth 78B through 78E, respectively, but due to the reverse bias in the direction of Arrow B, the reverse driven gear 48 rotated slightly, such that the gear teeth 80C and 80D will come into flank contact with the teeth 78C and 78D.

Figure 7:
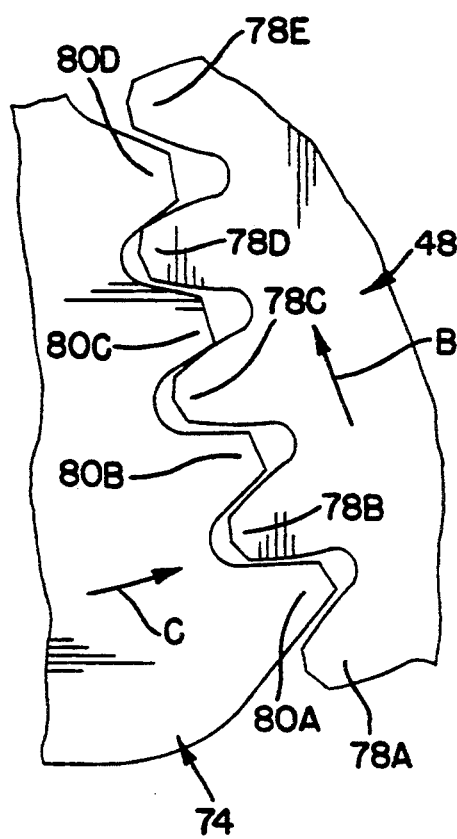
FIG. 7 is a view similar to FIG. 3, wherein the park pawl is at approximately 50 percent engagement when a reverse rotation bias is imposed on the park gear during the parking maneuver.
Figure 8:
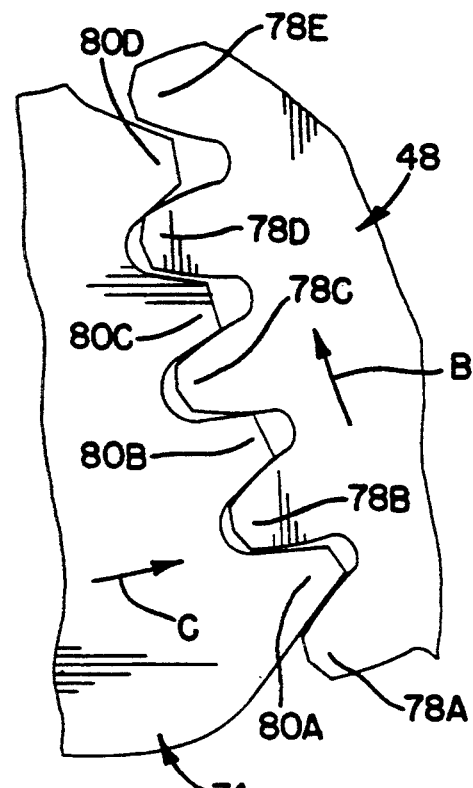
FIG. 8 is a view similar to FIG. 3, wherein the park pawl is at full engagement when a reverse rotation bias is imposed on the park gear during the parking maneuver.

The positions depicted in FIGS. 7 and 8 show the remainder of the engagement sequence of the parking pawl 74 with the reverse driven gear 48 when a reverse rotational bias is imposed on the output shaft 50.

In order to provide acceptable performance during torque transmission, the reverse driven gear 48, as well as the other working gears meshing therewith, are designed with a 22 degree pressure angle. However, if the parking pawl teeth 80A through 80D are permitted to engage with a pressure angle of 22 degrees, the push out force will become excessive. When the parking pawl is engaged with the gear 48, a force in the direction of Arrow D, as seen in FIG. 2, must be maintained on the parking pawl 74. With the pressure angle of 22 degrees, the force in the direction of Arrow D could become excessive if the vehicle is parking on a steep grade.

To prevent the force from becoming larger than desired, the tooth profile of the teeth 80A through 80D is rotated so that an effective 16 degree pressure angle is presented between the teeth of the parking pawl 74 and the reverse driven gear 48. This 16 degree pressure angle will maintain the forces that must be compensated for by the parking pawl hold-in mechanism to be maintained within an acceptable region in accordance with the current practice of parking pawl mechanisms.

If the operator attempts to engage the parking pawl 74 while the vehicle is moving with a predetermined velocity, the teeth 80A through 80D and the teeth 78 are designed such that a ratchet situation will occur. That is, the gear teeth 78 will slide across the tips of the teeth 80A through 80D with sufficient velocity such that the spring mechanism, not shown, engaging the parking pawl 74 will not be sufficient to urge the parking pawl 74 into engagement with the driven gear 48.

In order that the wear and the shear loading on the teeth tip be maintained at a desirable low level, the tip-to-tip meshing provided by the concentric addendum circles 82 and 84 is provided. This assures that the system will not have excessive wear during a ratcheting situation.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. In combination, a parking mechanism and power transmission having a working gear continuously drive connected with an output shaft comprising:

a pivotally mounted pawl having four park teeth formed thereon defining two forward parking tooth surfaces on two of said park teeth and two reverse parking gear surfaces on two other of said park teeth, each park tooth having a profile defining continuous engagement of only the forward parking tooth surfaces with respective teeth on the working gear when a park condition is being selected and the working gear has a forward rotation bias and continuous engagement of only the reverse parking tooth surfaces with respective teeth on the working gear when the park condition is being selected and the working gear has a reverse rotation bias; and means for operatively selecting the park condition with movement of the pawl teeth into engagement with the teeth of the working gear.

2. A parking mechanism in a power transmission comprising:

a transmission driven gear rotatably connected with a transmission output shaft, said gear having a plurality of teeth formed thereon defined by an outer surface having a constant diameter;

a parking pawl pivotably mounted relative to the gear member having a plurality of teeth defined by an engaging surface having a diametral portion defining a constant diameter addendum circle which is disposed in concentricity with the constant diameter of the driven gear when the teeth of the parking pawl and driven gear are in radial alignment;

the parking pawl has a minimum of four teeth and further wherein two of the teeth define surfaces in continuous engagement with the driven gear during parking when a forward rotational bias is imposed on the driven gear and another two of the teeth define surfaces in continuous engagement with the driven gear during parking when a reverse rotational bias is imposed on the driven bear; and means for selectively engaging the parking pawl with the gear member.

* * * * *